(12) United States Patent
Wang et al.

(10) Patent No.: US 9,676,135 B2
(45) Date of Patent: Jun. 13, 2017

(54) PEARLESCENT CONTAINER

(71) Applicant: The Procter & Gamble Company, Cincinnati, OH (US)

(72) Inventors: Ping Wang, Beijing (CN); Liang Yang, Beijing (CN); John Andrew McDaniel, Middletown, OH (US); Gian Armand Juliana DeBelder, Brussels (BE); Gaoyang Wang, Guangdong (CN)

(73) Assignee: The Procter & Gamble Company, Cincinnati, OH (US)

( * ) Notice: Subject to any disclaimer, the term of this patent is extended or adjusted under 35 U.S.C. 154(b) by 333 days.

(21) Appl. No.: 14/480,659

(22) Filed: Sep. 9, 2014

(65) Prior Publication Data

US 2014/0374966 A1 Dec. 25, 2014

Related U.S. Application Data

(63) Continuation of application No. 13/948,213, filed on Jul. 23, 2013, now Pat. No. 8,859,067, which is a continuation of application No. 13/671,634, filed on Nov. 8, 2012, now Pat. No. 8,535,770.

(30) Foreign Application Priority Data

Nov. 10, 2011 (WO) .................. CN2011/082040

(51) Int. Cl.
| | |
|---|---|
| *B29C 49/00* | (2006.01) |
| *B65D 1/40* | (2006.01) |
| *B29D 22/00* | (2006.01) |
| *C08J 3/22* | (2006.01) |
| *B29C 49/08* | (2006.01) |
| *B29K 23/00* | (2006.01) |
| *B29K 67/00* | (2006.01) |
| *B29K 83/00* | (2006.01) |
| *B29K 105/00* | (2006.01) |
| *B29L 31/00* | (2006.01) |

(52) U.S. Cl.
CPC .......... *B29C 49/0005* (2013.01); *B29C 49/08* (2013.01); *B29D 22/003* (2013.01); *B65D 1/40* (2013.01); *C08J 3/226* (2013.01); *B29K 2023/0633* (2013.01); *B29K 2067/003* (2013.01); *B29K 2083/00* (2013.01); *B29K 2105/258* (2013.01); *B29L 2031/712* (2013.01); *C08J 2367/02* (2013.01); *Y10T 428/1314* (2015.01); *Y10T 428/1352* (2015.01); *Y10T 428/1393* (2015.01); *Y10T 428/1397* (2015.01)

(58) Field of Classification Search
None
See application file for complete search history.

(56) References Cited

U.S. PATENT DOCUMENTS

| | | | |
|---|---|---|---|
| 4,874,807 | A | 10/1989 | Endo et al. |
| 4,879,331 | A | 11/1989 | Endo et al. |
| 5,708,084 | A | 1/1998 | Havenstein et al. |
| 2,535,770 | A1 | 9/2013 | Wang et al. |
| 2008/0167597 | A1 | 7/2008 | Dougherty |
| 2013/0064999 | A1 | 3/2013 | Wang et al. |
| 2013/0307198 | A1 | 11/2013 | Wang et al. |

FOREIGN PATENT DOCUMENTS

| | | |
|---|---|---|
| EP | 0456929 A | 11/1991 |
| JP | 56056831 A | 5/1981 |
| JP | A H08-208964 | 8/1996 |
| JP | 2004/018629 A | 1/2004 |
| JP | 2004292037 A | 10/2004 |
| WO | WO 2012062215 | 5/2012 |

OTHER PUBLICATIONS

International Search Report dated Jan. 18, 2012, U.S. App. No. 13/671,634, 12 pages.

*Primary Examiner* — Monica Huson

(74) *Attorney, Agent, or Firm* — David K. Mattheis

(57) ABSTRACT

A pearlescent container comprising about 86% to about 99.99% of a thermoplastic material having a Total Luminous Transmittance value of at least about 80%, about 0.01% to about 5% of a siloxane fluid having a viscosity of no greater than about 1,000,000 cst, wherein said thermoplastic material and said siloxane fluid are immiscible, forms a lamellar structure, and have a Refractive Index difference of at least about 0.1.

3 Claims, No Drawings

PEARLESCENT CONTAINER

FIELD OF THE INVENTION

The present invention relates to a pearlescent container comprising a thermoplastic material and a siloxane fluid.

BACKGROUND OF THE INVENTION

Containers made of thermoplastic materials, for example, polyethylene terephthalate (PET) are popularly used in various industries including cosmetic, laundry, and food industries. Containers having a pearlescent appearance are appealing to consumers. Consumers are more likely to buy products packaged within a pearlescent container since such containers tend to connote that a premium product is contained inside. Some particles including pearlescent mica, aluminum oxide, silicon dioxide and glass fibers have been reported as being mixed with thermoplastic materials to make a pearlescent container, for example in JP patent publication 2004-18629 by Fujitsu Limited. The pearlescent effect of the container surface disclosed herein is achieved by the light interference effect on such particles. However, the use of such particles is undesirable for a few reasons.

One reason is that the incorporation of such particles can negatively affect the surface smoothness of the container. Another reason is that the container surface is more likely to have unwanted weld lines and flow lines. A weld line is formed when separate melt fronts of the melted thermoplastic materials traveling in opposite directions meet. A flow line occurs if two emerging melt fronts flow parallel to each other and create a bond between them. These lines are undesirable from both an aesthetic and container strength point of view. Besides, such particles may also affect the recyclability of the bottle.

Other methods have been offered to provide a pearlescent appearance to container. Various combinations of thermoplastic materials have been reported to provide a pearl gray or so-called pearl-like appearance of a thermoplastic article. Such mixtures include the combinations of polyester and methacrylic, polypropylene and nylon, polyester and polymethyl pentene, as those disclosed in JP patent publication 56056831A by Mitsubishi Rayon Co. Ltd, JP patent publication 2004292037A by Toppan Printing Co. Ltd and EP patent publication 0456929A by Shiseido Co. Ltd. The use of such thermoplastic material combinations may also pose processing difficulties, including that caused by the unmatching melting points of two or more thermoplastic materials, which consequently requires the addition of compatibilizers to overcome this problem. Separately, some thermoplastic materials in the combination are chemically active, for example, methacrylic, which may compromise the stability of the container made therefrom.

Silicone has been reported as being used in making various thermoplastic articles for improving mechanical strength, for improving lubricity of a thermoplastic article, and useful as a processing aid. For example, as disclosed in U.S. Pat. No. 5,708,084 by Dow Corning, US patent publication 2008/0167597A1 by Playtex Products, Inc and JP patent publication 2004-018629A by Fujitsu Therefore, there is still a need for the development of a container which has a pearlescent appearance but which is without the shortcomings of the prior art.

SUMMARY OF THE INVENTION

The first aspect of the present invention relates to a pearlescent container comprising:

a) about 86% to about 99.99% of a thermoplastic material having a Total Luminous Transmittance value of at least about 80%, and b) about 0.01% to about 5% of a siloxane fluid having a viscosity of no greater than about 1,000,000 cst, wherein said thermoplastic material and said siloxane fluid are immiscible, forms a lamellar structure, and have a Refractive Index difference of at least about 0.1.

The second aspect of the present invention relates to a pearlescent container comprising:

a) about 86% to about 99.99% of a thermoplastic resin having a Total Luminous Transmittance value of at least 80%, and b) about 0.01% to about 5% of a siloxane fluid having a viscosity of no greater than about 1,000,000 cst, wherein said thermoplastic material and said siloxane fluid are immiscible and have a Refractive Index difference of at least about 0.1, and wherein said container is blow molded.

The third aspect of the present invention relates to a method of processing a thermoplastic resin, in which a siloxane fluid is added into said thermoplastic resin to form a master batch comprising about 10% to about 30% of said siloxane fluid, wherein said resin has a Total Luminous Transmittance value of at least 80%, wherein said siloxane fluid has a viscosity of no greater than about 1,000,000 cst, wherein said thermoplastic resin and said siloxane fluid are immiscible and have a Refractive Index difference of at least about 0.1.

DETAILED DESCRIPTION OF THE INVENTION

While the specification concludes with the claims particularly pointing and distinctly claiming the invention, it is believed that the present invention will be better understood from the following description.

It has been surprisingly found that a pearlescent container can be provided by blow molding a polymeric composition which comprises a relatively transparent thermoplastic resin and a siloxane fluid having a viscosity of no greater than about 1,000,000 cst. The pearlescence of the container of the present invention is not limited to any particular mechanism of action, but is believed to result from the formation of a lamellar structure composed of siloxane fluid layers and thermoplastic material layers. The thickness of the thermoplastic layer may range from a few to a few hundred nanometers. The spaces between each thermoplastic layers, which are occupied by the siloxane fluid layers, are comparable to or smaller than the visible light wave length range, i.e. 380-900 nanometers. The lamellar structure is believed capable of rendering a light interference effect between the incident light and the reflected light, thereby leading to the pearlescent appearance of the container surface. It has been interestingly and unexpectedly found that the lamellar structure is similar to what is found in a natural pearl comprising calcium carbonate crystals pieces and concliolin membranes in alternating layers. Besides exhibiting pearlescence, the present container also has improved glossiness and surface smoothness, and has reduced number of weld and flow lines.

All percentages, parts and ratios are based upon the total weight of the present container unless otherwise specified.

Without being otherwise specified, the measurement is conducted at a temperature of around 25° C. and a humidity of 50±5%.

As used herein, the term "pearlescent container" means the container surface shows a pearl-like luster effect. The present container can be a bottle, a tottle, a cap, a jar, a cup and the like. For perspective, tottle is one type of bottle which can sit on its cap end.

As used herein, the terms "thermoplastic material" and "thermoplastic resin" are defined herein as polymeric raw material that is capable of being repeatedly shaped or molded with the application of heat and/or pressure. Normally, it is understood that "thermoplastic resin" represents the raw material in the form of a resin, while the "thermoplastic material" represents the finished material in a thermoplastic article made from the thermoplastic resin.

As used herein, the term "siloxane fluid" refers to a siloxane which is in the form of a fluid at room temperature.

As used herein, the term "lamellar structure" means the siloxane fluid and the thermoplastic material form fine alternating layers in lamellar form. The lamellar structure can be observed in the cross-section view of the thermoplastic material microscopically, such as through Scanning Electron Microscope (SEM). The siloxane fluid layer distributed between the thermoplastic material layers can be in the form of a whole coherent piece, or it can be in the form of a number of discontinuous pieces.

As used herein, the term "Total Luminous Transmittance (Tt)" is defined as the percentage of transmitted light to incident light. The luminous transmittance is tested according to ASTM D-1003 "Standard Test Method for Haze and Luminous Transmittance of Transparent Plastics". A sample thickness of 2.5 mm and a tungsten lamp light source are used for the Tt measurement herein.

As used herein, "said thermoplastic material and said siloxane fluid are immiscible" means there is an interface between the siloxane fluid and the thermoplastic material. The immiscibility can be characterized by the difference of Solubility Parameters (δ) between the resin and the siloxane fluid.

As used herein, the term "Solubility Parameter (δ)" provides a numerical estimate of the degree of interaction between materials, and can be a good indication of solubility between polymers. Materials with similar δ values are likely to be miscible. The Hildebrand Solubility Parameter is used herein for the present invention. As used herein, the term "Refractive Index ( )" is expressed as a ratio of the speed of light in vacuum relative to that in another medium. RI (nD25) data is used herein, where nD25 refers to the RI tested at 25° C. and D refers to the D line of the sodium light. RI data of various thermoplastic materials and siloxane fluids is readily available from books and/or online RI databases.

As used herein, the term "blow molding" refers to a manufacturing process by which hollow plastic particles are formed. The blow molding process begins with melting or at least partially melting or heat-softening the plastic and forming it into a parison or preform, where said parison or preform can be formed by a molding or shaping step such as injection molding. The parison or preform is a tube-like piece of plastic with a hole in one end in which compressed air can pass through. The parison or preform is then clamped into a mold and air is pumped into it. The air pressure pushes the plastic out to conform to the shape of the mold. Once the plastic has cooled and hardened the mold opens up and the part is ejected. In general, there are three main types of blow molding: extrusion blow molding, injection blow molding, and injection stretch blow molding.

As used herein, the term "two or more material layers" means two or more macro-scale layers of a container, as opposed to the nano-scale alternating layers in above mentioned lamellar structure.

The elements of the present pearlescent container are described in more detail below.

Thermoplastic Material

The present pearlescent container comprises from about 86%, about 90 and about 95% to about 98%, about 99%, about 99.99% by weight of a thermoplastic material having a Total Luminous Transmittance value of at least about 80%, or at least about 85%.

In the present invention, useful thermoplastic materials include polyester such as polyethylene terephthalate (PET), polystyrene (PS), polycarbonate (PC), polyvinylchloride (PVC), low density polyethylene (LDPE), ethylene/vinyl acetate (EVA), poly(ethylene terephthalate) glycol (PETG), polyethylenenaphthalate (PEN).

Useful thermoplastic material can also include blends of PET with other polymers, including polybutylene terephthalate (PBT), polycarbonate (PC), polycarbonate/acrylonitrile butadiene styrene (PC/ABS), styrene butadiene copolymer (SBS), polyamide (PA), polyethylene (PE) and the like.

Useful thermoplastic material can also include styrene copolymers including acrylonitrile-styrene copolymer (AS), styrene-butadiene block copolymer (SBC) and the like.

Useful thermoplastic material can also be blends of polycarbonate with other polymers, including polycarbonate/polymethyl methacrylate blend (PC/PMMA) and polycarbonate/polyamide blend (PC/PA).

Useful thermoplastic material can also be chlorinated polyvinylchloride (CPVC) or a blend of polyvinylchloride with methyl methacrylate-butadiene-styrene copolymer (PVC/MBS).

In one embodiment, the thermoplastic material is selected from a group consisting of polyethylene terephthalate, polystyrene, polycarbonate, polyvinylchloride, and mixtures thereof.

When more than one species of the above mentioned thermoplastic material is used in making the present container, it is preferred that one major thermoplastic material is used which constitutes at least about 86%, about 91%, about 95%, or about 98% by total weight of the mixture of two or more thermoplastic materials used in manufacturing the present container.

Recycled thermoplastic materials can be used in the present invention. In one embodiment, the thermoplastic material includes a polymer selected from the group consisting of post-consumer recycled polyethylene terephthalate (PCRPET); post-industrial recycled polyethylene terephthalate (PIR-PET); regrind polyethylene terephthalate; and a mixture thereof. The container made from the thermoplastic material can be recyclable as well.

Any of the thermoplastic material may be formed by using a combination of monomers derived from renewable resources and monomers derived from non-renewable (e.g., petroleum) resources. For example, the thermoplastic material may comprise bio-derived (in part or whole) polymers or comprise bio-derived polymers or polymers made from bio-derived monomers.

In another embodiment, the present container comprises at least about 10%, about 25%, about 50%, about 75%, about 90% or about 100% of polyethylene terephthalate (PET), which has a bio-derived content of at least about 90%, about 93%, about 95%, or about 100%.

Siloxane Fluid

The present pearlescent container comprises from about 0.01%, about 0.05%, and about 0.1% to about 0.5%, about 1.5%, and about 5% of siloxane fluid having a viscosity of no greater than 1,000,000 cst. In one embodiment of the present invention, the siloxane fluid has a viscosity of at least about 20 cst, at least about 50 cst, or at least 350 cst.

The siloxane fluid can be a linear or branched polymer or a copolymer. Useful siloxane fluid can be a diorganopolysiloxane. In one embodiment, the diorganosiloxane have one or more pendant or terminal groups selected from a group consisting of hydroxyl, vinyl, amine, phenyl and mixtures thereof. Suitable siloxane fluid includes polydimethylsiloxane homopolymers, copolymers consisting essentially of dimethylsiloxane units and methylphenylsiloxane units, copolymers consisting essentially of diphenylsiloxane units and methylphenylsiloxane units. Mixtures of two or more of such siloxane fluid polymers and copolymers can be employed, either first mixed together then combined with thermoplastic resin, or separately added to the thermoplastic resin either at the same or different times.

In one embodiment, the siloxane fluid is a polydimethylsiloxane. In another embodiment, the present pearlescent container, the thermoplastic material is polyethylene terephthalate (PET), and the siloxane fluid is polydimethylsiloxane having a viscosity of 1000 cst.

In another embodiment, the siloxane fluid is a silicone elastomer, including but not limited to an amine modified silicone elastomer.

The siloxane fluid and the thermoplastic material are immiscible and have sufficiently different Refractive Index. This immiscibility and differences in Refractive Index enable the light interference to occur and become apparent between the lamellar structure composed by the thermoplastic material and the siloxane fluid. In one embodiment, the siloxane fluid and the thermoplastic material have a Solubility Parameter difference of at least about $0.5 \text{ cal}^{1/2} \text{ cm}^{-3/2}$. In another embodiment, the thermoplastic material and the siloxane fluid have a Refractive Index difference of at least about 0.1, about 0.15.

Additives

The present pearlescent container can also comprise less than about 9%, less than about 5%, or less than about 1% the following ingredients including fillers, cure agents, anti-statics, lubricants, UV stabilizers, anti-oxidants, anti-block agents, catalyst stabilizers, colorants and other processing aids commonly used.

In one embodiment of the present invention, the present container comprises less than 1%, or even less than about 0.1% of a colorant selected from the group consisting of mica, $SiO_2$, $Al_2O_3$, glass fiber, and the mixtures thereof.

Methods of Manufacturing

The present container comprises about 86% to about 99.99% of a thermoplastic resin having a Total Luminous Transmittance value of at least about 80%, and about 0.01% to about 5% of a siloxane fluid having a viscosity of no greater than about 1,000,000 cst, wherein the resin and the siloxane fluid are immiscible and have a Refractive Index difference of at least about 0.1, and wherein the container is blow molded. Blow molding includes injection stretch blow molding (ISBM), injection blow molding (IBM) and extrusion blow molding (EBM).

The method of manufacturing the present container can start from a method of processing the thermoplastic resin to make a master batch and then diluting the master batch with additional amounts of the same or different thermoplastic materials to make a uniform blend. Additives including colorants can be incorporated into the master batch during processing the thermoplastic resin. The uniform blend can then be subjected to a further step of injection stretch blow molding, injection blow molding or extrusion blow molding.

In the formation of a container using an ISBM process or an IBM process, the above processed thermoplastic material is melted and injected into a pre-form (i.e., a semi-molten hollow plastic tube), then the parison is filled with pressurized air, thereby forcing the tube to expand outwardly to contact a mold surface in the shape of the desired container. There can be optional intermediary steps where the pre-form is cooled after forming then later re-heated before being filled with pressurized air. In the formation of a plastic container using EBM process, the above processed thermoplastic material is melted and extruded into a parison, and followed by the blow molding steps mentioned above.

The methods used for manufacturing the present container may also start from the process of mixing siloxane fluid with thermoplastic resin into a uniform blend without forming a master batch, and then directly subjecting the blend to injection stretch blow molding, injection blow molding or extrusion blow molding.

In one embodiment of the present invention, the present container is a layered container, which comprises two or more material layers. In another embodiment of the present invention, the present container has a barrier material layer or a recycled material layer between an outer thermoplastic material layer and an inner thermoplastic material layer. Such layered containers can be made from multiple layer parisons or preforms according to common technologies used in the thermoplastic manufacturing field. Within the layered container, not all of the material layers necessarily comprise siloxane fluid, but at least one layer should.

In another embodiment, one or more of the container's surface material layers comprise siloxane fluid to provide the pearlescence, such as the outward facing material layer which could be visible to a person when viewing a container on a retail store shelf, or the inward facing material layer which could be visible to a person when looking inside a container.

In one aspect of the invention, it relates to a method of processing a thermoplastic resin, comprising a step of adding a siloxane fluid into the thermoplastic resin to form a master batch comprising about 10% to about 30% of the siloxane fluid by weight of said blend, wherein the resin has a Total Luminous Transmittance value of at least 80%, wherein the siloxane fluid has a viscosity of no greater than about 1,000,000 cst, wherein the resin and siloxane fluid are immiscible and have a Refractive Index difference of at least about 0.1.

Methods of Measurement

Pearlescent Score

The pearlescent appearance of containers of the same shape is observed by a group of 30 panelists (15 male, 15 female, average age of 28), who are asked to rank a group of containers in the order of pearlescence.

Then, a pearlescent score for a particular container among a group of containers including a pure PET container is calculated according to the following formula. The pearlescent score of the pure PET bottle is used as a reference for the calculation.

$$\text{Score of a container } X = \frac{\left(\sum_{i=1}^{n} X_i \% \times I_i\right)/n}{\left(\sum_{i=1}^{n} PET_i \% \times I_i\right)}$$

Wherein, n is the sample size of the group of containers tested.

$X_i$ refers to the percentage of panelists who designate a specific container X as having a ranking score of $I_i$ (i=1, 2, ... n), $I_i$ refers to the ranking score corresponding to the order of pearlescent score, where $I_1$=n, $I_2$=n−1, ..., $I_n$=1.

Glossiness

An active polarization camera system called SAMBA is used to measure the specular glossiness of the present pearlecent container. The system is provided by Bossa Nova Technologies and a polarization imaging software named VAS (Visual Appearance Study software, version 3.5) is used for the analysis. The front labeling panel part of the container is tested against an incident light. An exposure time of 55 msec is used.

The incident light is reflected and scattered by the bottle. The specular reflected light keeps the same polarization as the incident light and the volume scattered light becomes unpolarized. SAMBA acquires the polarization state of a parallel image intensity (P) contributed by both the reflected and scattered light, and a crossed image intensity (C) of the image contributed only by the scattered light. This allows the calculation of glossiness G given by G=P−C.

Smoothness

The surface smoothness of the present container can be measured by Atomic Force Microscope (AFM). The surface smoothness information is gathered by "feeling" the surface with a mechanical probe. The AFM supplied by Veeco is used herein. It is set at a contact mode for the smoothness measurement. The detection area is on the center of the front labeling panel area of the bottle. An area of 580 nm×580 nm is used and data is collected as the average value of 10 spots within the detection area.

Roughness measured in nm from AFM measurement can be represented by by arithmetic mean value ($R_a$) of the absolute height $y_i$ in vertical direction at specific position i.

$R_a$ is represented by $$R_a = \frac{1}{n}\sum_{i=1}^{n} |y_i|.$$

The $R_a$ value increases with the roughness.

Weld Line, Flow Line

The weld lines and flow lines can be visually inspected through naked eye observation.

Thermoplastic Material Platelet Structure

The lamellar structure of the present thermoplastic material with siloxane fluid distributed therein can be observed via SEM (Scanning Electron Microscope) by scanning of the cross-section view of the thermoplastic material. A HITACHI S-4800 SEM system is used herein.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Examples 1-10 represent the bottles made according to the present invention. Comparative Examples 1-6 represent bottles falling outside of the present invention.

The following materials are used in the Examples and Comparative Examples:

1. PET, commercially available under the name of CB-602 from Far Eastern Industries (Shanghai) Ltd. It has a Tt of 90%, a RI (nD 25) of 1.57.
2. LDPE (low density polyethylene), commercially available under the name of LDPE 868 from Sinopec MPCC. It has a Tt of 40%, a RI (nD 25) of 1.51.
3. Polydimethylsiloxanes (at four viscosities 10 cst, 1,000 cst, and 60,000 cst, 1,000,000 cst), commercially available under XIAMETER PMX-200 siloxane fluid from Dow Corning
4. Ethylmethyl, methyl (2-phenylpropyl) siloxane, commercially available as Dow Corning® 230 siloxane fluid from Dow Corning, viscosity 1350 cSt.
5. Hydroxyl terminated dimethylsiloxane, commercially available under XIAMETER PMX-0156 silanol fluid from Dow Corning, viscosity 72 cst
6. Vinyltrimethoxy silane, Silquest®A-171™ from Momentive Performance Materials
7. Amine modified polysiloxane elastomer, J-40, from Foshan Yingzhi Organic Silicon Materials Co. Ltd
8. Golden red and Golden green are colorant mixtures comprising pearlescent mica Iriodin® 32 from Merck in addition to silicone, PET, dye and dispersants
9. Mica, Taizhu Silver white 1000, from Merck The bottles of Examples 1-10 and Comparative Examples 1-5 can be manufactured according to the following process.

First, a mixture of the thermoplastic resin with siloxane fluid and colorants (if any) is prepared. A sufficient amount of siloxane fluid is added to the thermoplastic resin so that the total concentration of the siloxane fluid is about 10% of PET resin by weight of the blend. Then, the blend is subjected to a twin screw extruder having an extruder length/diameter (L/D) of 43 and diameter of 35.6 mm to form the master batch pellets upon cooling in a water bath. When silicone fluids of different viscosities are used, the time needed to achieve a homogenous mixture with the thermoplastic resin may vary. The conditions can be determined by using the common knowledge of a skilled person in this practice.

Second, the above prepared master batch is blended with the thermoplastic resin again at a let-down ratio of about 0.8% to 8% and the resulting mixture is dried for about 4-6 hrs under 160-170° C. before using it. The dried mixture is then injection molded into a tube-like preform under a barrel temperature of 260-270° C., under an injection pressure of 70-80 MPa and at an injection speed of 60-70 mm/s The preform is ejected out of the mold after it is cooled down.

Third, the cooled preform is heated and softened again with an infrared heating machine at 70-90° C. for about 2 minutes. Then, the softened preform is put into a bottle mold, and the preform is then blown into a bottle under a blowing pressure of about 2.5-3.5 Mpa, at a mold temperature of 20 to 30° C., and at a stretch ratio of 6:1 by using a blow machine Type CP03-220 from Guangzhou RiJing Inc. The bottle is ejected out of mold after it has cooled down.

Examples 1-8 and Comparative Examples 1-4

Examples 1-8 represent the pearlescent bottles made according to the present invention, and comparative Examples 1-4 represent those bottles made not according to the present invention. ΔRI refers to the Refractive Index difference.

TABLE 1

|  | Example 1 | Example 2 | Example 3 | Example 4 | Example 5 | Example 6 | Example 7 | Example 8 |
|---|---|---|---|---|---|---|---|---|
| Silicone | 0.4% polydimethyl-siloxane, 10 cst | 0.4% polydimethyl-siloxane, 1000 cst | 0.8% Polydimethyl-siloxane, 1000 cst | 0.08% polydimethyl-siloxane, 60,000 cst | 0.4% Ethylmethyl, methyl(2-phenylpropy) siloxane 1350 cst | 0.4% polydimethyl-siloxane, 0156, 72 cst | 0.4% amine modified polysiloxane elastomer | 0.4% polydimethyl-siloxane, 1,000,000 cst |
| Resin | 99.6% PET | 99.6% PET | 99.2% PET | 99.02% PET | 99.6% PET | 99.6% PET | 99.6% PET | 99.6% PET |
| ΔRI | 0.17 | 0.17 | 0.17 | 0.17 | 0.11 | 0.11-0.16 | 1.16-1.64 | 0.17 |
| Pearlescent score | 4.66 | 6.17 | 6.98 | 2.44 | 3.72 | 3.91 | 2.49 | 2.40 |

|  | Comp. Example 1 | Comp. Example 2 | Comp. Example 3 | Comp. Example 4 |
|---|---|---|---|---|
| Silicone | — | 0.4% Vinyltrimethoxy silane, | 0.8% polydimethyl-siloxane, 1000 cst, | — |
| Resin | 100% PET | 99.6% PET | 99.2% LDPE 868 | 100% LDPE 868 |
| ΔRI | n/a | 0.077-0.154 | n/a | n/a |
| Pearlescent score | 1.00 | 1.49 | n/a | n/a |

Results

The pearlescent score of the Examples 1-8 bottles and the Comparative Examples 1-2 bottles is scored according to the pearlescent score measurement method described in previous paragraphs. The pearlescent scores in the above Table show that all the bottles of present Examples 1-8 have significantly higher scores than the pure PET bottle without the incorporation of siloxane fluid of Comparative Example 1. Comparative Example 2 bottle comprising vinyltrimethoxy silane instead of a siloxane fluid does not show a significantly pearlescent improvement against that of the pure PET bottle.

The pearlescent score of the Comparative Example 3 bottle comprising LDPE and polydimethylsiloxane is separately compared with a pure LDPE bottle of Comparative Example 4. The reason is because the LDPE bottle shape is different from the PET bottles of Examples 1-8 and Comparative Example 1-2, thus making it inappropriate to be included in the same test group with those bottles. It is found that there is no pearlescent score improvement of the Comparative Example 3 bottle against the Comparative Example 4 bottle. This result is expected since Tt of LDPE is as low as 40%, which is much smaller than the required minimum Tt of about 80% in the present invention.

Examples 3, 9-10 and Comparative Examples 1, 5-6

Examples 3 and Examples 9-10 represent the pearlescent bottles of the present invention, and Comparative Examples 1 and 5 represent those bottles not according to the present invention.

TABLE 2

|  | Example 3 | Comparative example 1 | Example 9 | Comparative Example 5 | Example 10 | Comparative Example 6 |
|---|---|---|---|---|---|---|
| Silicone | 0.8% polydimethyl-siloxane 1000 cst | — | 0.8% polydimethyl-siloxane 1000 cst | — | 0.8% polydimethyl-siloxane 1000 cst | — |
| Colorant | — | — | 4% Golden red | 4% Golden red | 4% Golden green | 4% Golden Green |
| Resin | 99.2% PET | 100% PET | 95.2% PET | 96% PET | 95.2% PET | 96% PET |
| Glossiness(G) | 143 | 139 | 84 | 61 | 99 | 77 |

Results

It is observed from Table 2 that the Example 1 bottle comprising polydimethylsiloxane shows improved glossiness versus the pure PET bottle of Comparative Example 1.

It is also observed from Table 2 that and the bottles of Examples 9-10 comprising golden red and golden green colorants in addition to polydimethylsiloxane also show improved glossiness when compared to the bottles of Comparative Examples 5 and 6 which does not comprise polydimethylsiloxane. The glossiness of a pearlescent container comprising colorant particles is significantly improved with the addition of polydimethyl siloxane.

Example 3 and Comparative Examples 1, 6

Examples 3 represent the pearlescent bottles of the present invention, and Comparative Examples 1 and 6 represent those bottles not according to the present invention.

TABLE 3

|  | Comparative Example 1 | Comparative Example 6 | Example 3 |
| --- | --- | --- | --- |
| Silicone | — | 1% mica | 0.8% polydimethylsiloxane 1000 cst |
| Resin | 100% PET | 99% PET | 99.2% PET |
| Roughness ($R_a$) | 2.245 | 5.009 | 0.988 |
| Weld line (Y/N) | N | Y | N |
| Flow line(Y/N) | N | Y | N |

Results

It is observed from Table 3 that the Example 3 bottle comprising polydimethylsiloxane has the lowest $R_a$ value (i.e., highest smoothness) as compared to Comparative Example 1 bottle which is a pure PET bottle and the Comparative Example 6 bottle which is a pearlescent bottle made including mica.

It is observed from Table 3 that the Example 3 bottle does not show weld lines or flow lines, comparing to the traditional mica pearlescent bottle of comparative Example 6 which does.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a pearlescent container, comprising the steps of:
   a) providing a perform or parison for making a pearlescent container, the perform or parison comprising:
      a) about 86% to about 99.99%, by weight of the container, of a thermoplastic material having a Total Luminous Transmittance value of at least about 80%,
      b) about 0.01% to about 5%, by weight of the container, of a siloxane fluid having a viscosity of no greater than about 1,000,000 cst, wherein said thermoplastic material and said siloxane fluid are immiscible and have a Refractive Index difference of at least about 0.1, and wherein the intermediate product form is a preform or a parison;
   b) processing the intermediate product form by blow molding to form the pearlescent container.

2. The process according to claim 1, wherein the step of providing a perform or parison consists of providing a preform, and said preform is processed by stretch blow molding to form the pearlescent container.

3. The process according to claim 2, wherein the stretch blow molding has a stretch ratio of about 6:1.

* * * * *